(12) United States Patent
Kelleher

(10) Patent No.: US 6,938,188 B1
(45) Date of Patent: Aug. 30, 2005

(54) METHOD FOR VERIFYING FUNCTIONAL INTEGRITY OF COMPUTER HARDWARE, PARTICULARLY DATA STORAGE DEVICES

(75) Inventor: Terence M. Kelleher, Ithaca, NY (US)

(73) Assignee: Advanced Digital Information Corporation, Redmond, WA (US)

( * ) Notice: Subject to any disclaimer, the term of this patent is extended or adjusted under 35 U.S.C. 154(b) by 514 days.

(21) Appl. No.: 10/058,243

(22) Filed: Jan. 29, 2002

(51) Int. Cl.[7] ............................................. G06F 11/00
(52) U.S. Cl. ......................................... 714/43; 714/56
(58) Field of Search ........................... 714/5, 6, 43, 42, 714/56, 750

(56) References Cited

U.S. PATENT DOCUMENTS

| | | | |
|---|---|---|---|
| 5,161,162 A | * | 11/1992 | Watkins et al. ............... 714/43 |
| 5,475,814 A | * | 12/1995 | Tomimitsu ................... 714/30 |
| 5,586,250 A | | 12/1996 | Carbonneau |
| 5,835,700 A | | 11/1998 | Carbonneau |
| 5,881,051 A | | 3/1999 | Arrowood |
| 5,966,510 A | | 10/1999 | Carbonneau |
| 5,974,250 A | | 10/1999 | Angelo |
| 6,038,687 A | * | 3/2000 | Ho .............................. 714/30 |
| 6,052,362 A | | 4/2000 | Somer |
| 6,321,286 B1 | * | 11/2001 | Goodrum et al. ........... 710/311 |
| 6,327,688 B1 | * | 12/2001 | Stolitzka et al. ............ 714/750 |

\* cited by examiner

Primary Examiner—Robert Beausoliel
Assistant Examiner—Yolanda L Wilson
(74) Attorney, Agent, or Firm—Perkins Coie LLP

(57) ABSTRACT

The present invention features a method for performing an end-to-end data path integrity check in a computer or computer-like system such as a storage router. A predetermined data test pattern is stored in a memory and then transmitted across a data path by a data initiator to a data receiver. The received data test pattern is then retransmitted to the data initiator where it is compared to the original data. Any discrepancies cause an error condition to be declared. The data path may be disabled until the defective component in the data path is isolated and fixed. The method is hardware independent so it may be easily used in an open systems environment where hardware components may be provided by different vendors.

15 Claims, 3 Drawing Sheets

METHOD FOR VERIFYING FUNCTIONAL INTEGRITY OF COMPUTER HARDWARE, PARTICULARLY DATA STORAGE DEVICES

FIELD OF THE INVENTION

This invention pertains to diagnostic testing of computer hardware and, more particularly, to a method for periodically testing the data path integrity between data storage interfaces and internal buffer memory.

BACKGROUND OF THE INVENTION

It is common in computer systems to perform diagnostic tests when a system is started (i.e., booted). Faults detected at that time result in the system being placed in an error state. The computer, therefore, cannot be started without user intervention.

It is also common in computer systems to monitor system components during normal operation to detect errors that may occur during normal operations. For example, parity is generated and subsequently checked as data is transmitted across data buses or when data is sent to a data storage device. Typically, any other diagnostic testing during normal system operation requires user intervention to specifically execute a diagnostic task. Also typically, these diagnostic tasks work only with a limited portion or sub-system of the computer and, in addition, that sub-system must be disabled for the diagnostic test to be performed.

While current computer technology provides methods for detecting errors in memory sub-systems and on data buses, heretofore those methods have not been used to provide similar protection to the interfaces connected to those data buses. For example, a processor may issue a write command across a PCI bus to an area of system memory. While the PCI bus is protected using some form of parity checking and the system memory may be protected using parity or ECC methods, the interfaces between the processor and the PCI bus, and the interface between the PCI bus and the memory have no such protection. While the anticipated error rates on these interfaces are relatively low, they are not zero.

These low error rates are generally considered to be tolerable for general computing applications. However, some high-end computer systems (i.e., mainframe computers) utilize end-to-end data checking which provides protection to the entire data path, including the interfaces. This protection is provided using auxiliary data check lines and checksums for data block transfers. This feature requires designs that have control of each of device or process along the data path. This approach is not practical in the "open systems" environment where components such as bus controllers, memory controllers, FIFO buffers, I/O controllers, etc. may be procured from a variety of different sources. Typically, each of these components is designed to have as low a cost as possible and, even if a standard existed, the incorporation of features to provide the end-to-end data checking could make these components non-competitive.

FIG. 1 shows a system block diagram of a computer system 100 of the prior art without any end-to-end data checking. Computer system 100 includes a central processor 102, memory controller 104, memory 106, processor to PCI bridge 108, SCSI controller 110, and fibre channel controller 112, all interconnected by data busses, generically referred to by reference number 114. External disk drives 116 are connected to computer system 100 through SCSI controller 110 by a parallel SCSI bus 118.

If data is read from the disk drives 116 into computer system 100, the data is transferred across the parallel SCSI bus 118, where parity checking detects data errors. The data must then pass through the SCSI controller 110, which may contain buffer memory, FIFOs, data holding registers, and similar internal components and sub-systems. If a data error occurs within one of these internal components of the SCSI controller 110 (i.e., the SCSI interface), the data error is not detected. The data is then transferred from the SCSI controller 110 across the PCI bus 114 to the memory controller 104. If an error occurs on the PCI bus, then parity checking on the PCI bus 114 may detect that error. The memory controller 104 may also contain data buffers, FIFOs and data holding registers. If an error occurs in the memory controller 104, that error is also not detected. If the memory 106 supports ECC or parity checking, then memory controller 104 generates the ECC or parity and stores it along with the data in the memory 106. If an error has occurred in memory controller 104, then the ECC or parity is generated on corrupt data, rather than on the original, correct data.

As has been shown, a risk of data corruption exists as data passes through both the SCSI controller 110 and the memory controller 104.

The need for end-to-end data checking is also present in storage routers. A storage router is a dedicated computer system that is attached to one or more host systems via external storage interfaces, such as fibre channel, parallel SCSI, Ethernet, Infiniband or ATM. The storage router is also attached to storage devices, such as disk drives or tape drives, via external storage interfaces. A storage router acts as a bridge, providing host computer systems access to the storage devices.

A storage router is typically implemented as a single chip computer (or processor) with one or more internal busses, but one PCI bus. I/O controllers attached to these PCI busses connect to the storage interfaces. A memory controller attaches to the PCI bus to provide both the processor and the I/O controllers access to a central memory. In such a storage router system, parity may be generated by both the single chip computer and by the I/O controllers. Data sent across these PCI busses is verified so that no errors are introduced in the data as it is transferred. There is, however, no provision for data checking within the I/O controllers or processor, or through the memory controller. If a hardware failure occurs in the I/O controllers, the memory controller, or the processor, it is possible for data being transferred through the storage router to be corrupted, without detection.

FIG. 2 shows a block diagram of a typical storage router 200, where storage router 200 is similar to computer system 100 shown in FIG. 1, but in addition to a first PCI bus 214a, it has a second PCI bus 214b. Memory space 206 is accessible via memory controller 204 through both of the PCI busses 214a, 214b. The processor 202 is typically an integrated device that contains dual PCI interfaces 214a, 214b and an internal memory controller 204, which controls a second memory area. The storage router also provides additional storage interfaces 210a, 210b, 220a, 220b, some of which are attached to host systems 222 rather than to storage devices (e.g., disk drives 166, etc.).

It is, therefore, a principal object of the invention to provide a method for performing a complete test of the data path within a system between system memory and storage interfaces.

It is an additional object of the invention to provide a method for checking data buses, data initiators and data targets within a system as well as all intervening data interfaces.

It is another object of the invention to provide a method for performing a complete end-to-end data path test which may be used with off-the-shelf hardware components and does not require a specific hardware configuration for its implementation.

It is a further object of the invention to provide a method for performing a complete end-to-end data path check wherein a data test pattern is periodically written by a data initiator to a data target.

It is an additional object of the invention to provide a method for performing a complete end-to-end data path check wherein the data test pattern is copied back to the data initiator and compared to the original pattern.

It is a still further object of the invention to provide a method for performing a complete end-to-end data path check wherein the data test pattern checks all data bit lines within a particular data path in both high and low states.

It is again an object of the invention to provide a method for performing a complete end-to-end data path check wherein multiple data paths are checked.

SUMMARY OF THE INVENTION

In accordance with the present invention, there is provided a novel Data Path Test (DPT) that is specifically intended to provide a complete test of the data path connections between system components. Where current technology provides tests of data as it passes across the system busses, the inventive DPT method provides a check of the system busses, the data initiators and the data targets. The DPT method is further designed to operate in an open system, where the components in use are "off-the-shelf", and do not provide any specific hardware support for data checking.

The DPT method of the invention provides an end-to-end check of data integrity through a computer system. The DPT allocates memory space in the general memory of a computer system; then the central processor periodically writes a data pattern to a data receiver (e.g., an I/O controller, a memory location, etc.). The data test pattern is then copied back to the central processor where it is compared to the original data. Any otherwise undetected error in the interface components is detected by this comparison. A data pattern is selected which provides testing of all data bit lines in the data path in both high and low states.

By using the novel DPT procedure, the processor may test data transfer in two directions through the PCI bridge and through both interfaces of the memory controller. If no errors are detected, then the data paths through the PCI bridge and the memory controller are assumed to be reliable. If an error is detected, however, then some component or components along the data path is unreliable and the system can take whatever actions are necessary to prevent any further data flow through the failing component(s).

The processor can also perform tests to confirm the integrity of the I/O controllers. The processor may issue instructions to the fibre channel controller and the SCSI controller which will cause the controllers to read the pattern data from the memory into the controller's local buffer space and then to copy the pattern data back into the memory. The processor may then compare the copied data to the original pattern to determine if an error occurred during the data transfers. If no error occurred, then the test has determined that the data paths through the I/O controllers, the PCI bus and the memory controller are reliable. If an error is detected, however, then one or more components along the data path are unreliable and the system can take any necessary actions to prevent further data flow through those components.

Alternatively, the processor may directly write data representative of the data test pattern into the buffer space within the I/O controllers and read the data back to compare with the original pattern. If no error occurs, then the test has determined that the data paths through the I/O controllers, the PCI bus and the PCI bridge are reliable. If an error is detected, however, then one or more components of the data path are unreliable and the system can take any necessary actions to prevent further data flow through those components.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, the invention features a method for evaluating the end-to-end integrity of a data path in a computer and, more specifically, in devices such as storage routers.

Figure 3:
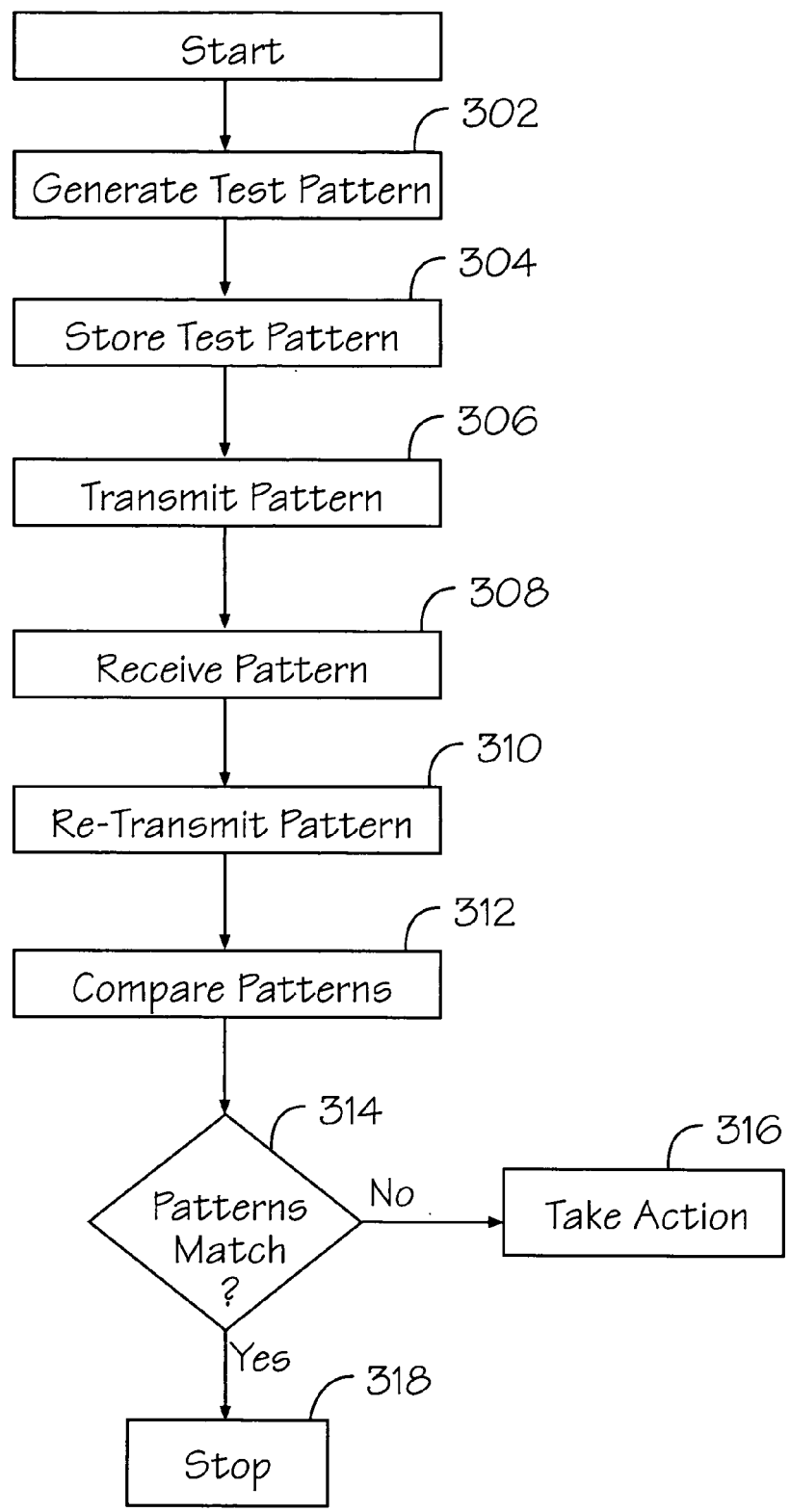
FIG. 3 is a flow chart of the inventive method.

The Data Path Test (DTP) method of the invention is a set of hardware independent procedures that allows testing of every component along a data path from a data initiator to a data receiver. Because there is no hardware dependence, the inventive DPT method is usable in open systems environments where the hardware components along a data path may be provided by several different vendors. FIG. 3 is a flow chart of the steps of the inventive DTP method. The flow chart of FIG. 3 describes a generic implementation of the inventive DPT method. First a data test pattern is generated, step 302, and stored in memory, step 304. The pattern in memory is transmitted by the data initiator, step 306 and received at a data receiver, step 308. The received pattern is then re-transmitted, step 310 from the data receiver back to the data initiator. The data test pattern received at the data initiator is compared to the original data test pattern, step 312. If the original and the received data test patterns are identical, step 314, the process terminates, step 318. If the patterns are not identical, step 314, action is taken, step 316.

The novel DPT method tests the I/O controller components by transferring a predetermined pattern of test data through the I/O controllers. The data pattern is chosen to exercise all data lines in the data path in both high and low states. Test patterns are chosen depending upon the number of data lines so that typically, all possible combinations of high and low bit patterns are exercised. Data test patterns are generated, step 302 and typically stored in memory, step 304. This test may be achieved either by instructing the I/O controller to copy the test pattern data from the system memory step 306 and to write it back to system memory, step 310, or by using the processor to write data to the I/O controller, step 306, and then to read the data back and compare, step 312. In either case, the data is transferred through the I/O controllers, buffers, FIFOs and registers, to test their operation.

In storage routers, the DPT method typically performs additional tests, which ensure data integrity on the additional data paths found in such devices. The central processor creates the test pattern data, step 302, in the local processor memory, step 304, and then copies it out to a buffer memory using the path across a first PCI bus, step 306, in the preferred embodiment. Alternately, a second data path or bus may be used for reading the data back, if desired. The processor then reads the data back, step 310, also using the path across the first PCI bus. The test then copies the test pattern data from the processor memory to the buffer memory using the path across a second PCI bus and then reads it back along the same path. In this way, the processor tests data transfer in two directions across both of the memory controller's PCI interfaces, using both of the processor's PCI interfaces.

The storage router may then perform the data path tests using the I/O controllers, as described above, with each I/O controller transferring the pattern data out from and back into the buffer memory across the PCI interface to which the I/O controller is connected.

The storage router may periodically perform the novel DPT, to confirm system reliability. In the event an error is detected, the storage router may be enabled to reject further command requests from the host systems, to prevent data corruption.

The storage router may also be used in a system where the host is sending data through the storage router to tape drives for the purpose of archiving the data. The archived data may later need to be restored to the host, to recover data lost from the host's local storage. It is therefore critical that the data saved on the tape drive be saved without error. A typical tape archiving session includes many write commands to the tape drive(s). Following the write commands, the host may perform an ending action, such as issuing a command to write a file mark at the end of the data, or rewinding the tape and unloading the tape from the drive. At the time that the ending action is performed, the storage router can invoke the inventive DPT method. A successful outcome of the DPT method at this point provides assurance that the data path components have not recently failed. The storage router may then complete the ending action and return a "good" status to the data initiator. If, however, the DPT fails, the storage router returns an error status to the host (i.e., data initiator), indicating that a hardware failure has occurred.

If the ending action fails, the backup application is alerted that the data has not been successfully written to tape. The backup operation may then initiate actions to retry the backup session on another device or take some other action. As with the periodic check, if the ending action check determines that a data path component is unreliable or faulty, the storage router may be programmed to reject any further commands from any host systems, to prevent data corruption.

Figure 1:
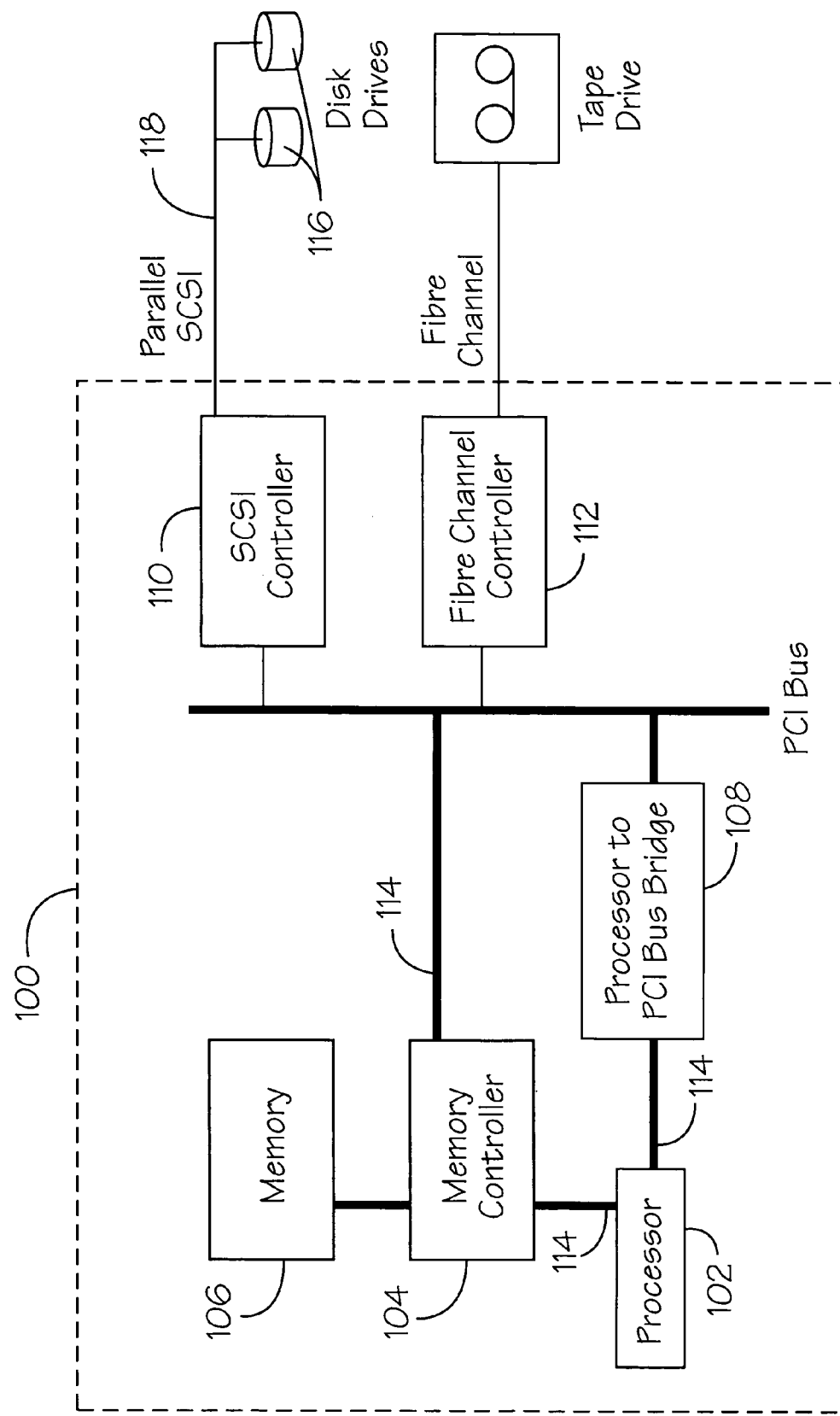
FIG. 1 is a schematic block diagram of a typical computer system.
Figure 2:
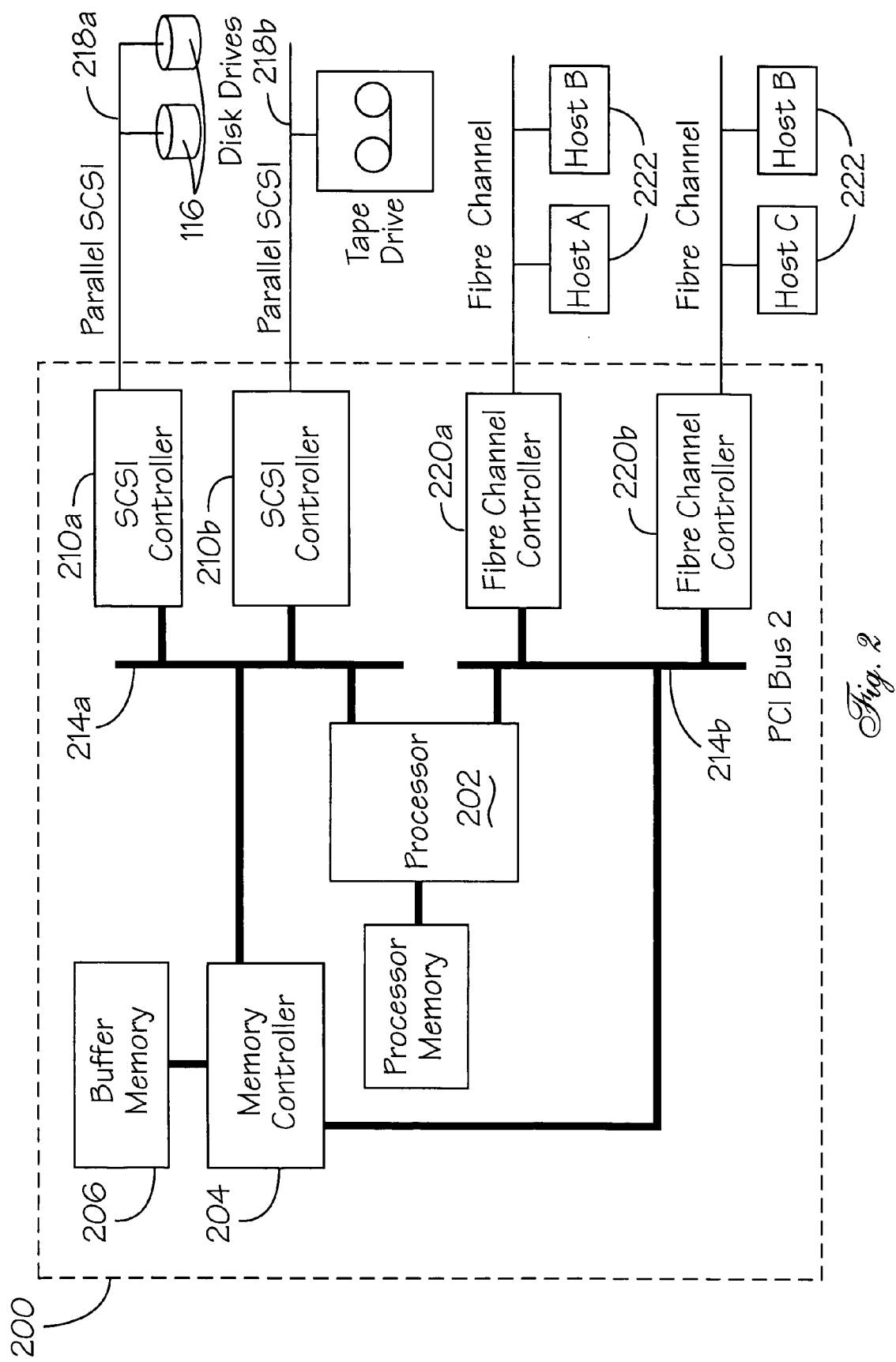
FIG. 2 is a schematic block diagram of a typical storage router.

Referring again to FIG. 1, the processor 102 has access to the memory 106 directly through the memory controller 104, and also through the PCI bridge 108 and the PCI bus 114. Processor 102 also has access to the SCSI controller 110 and the fibre channel controller 112 through the PCI bridge 108 and PCI bus 114. Processor 102 performs the data path check by allocating a space for the original test pattern data (not shown) in the memory 106 and writing a data test pattern to space in the memory 106. Processor 102 writes to this space by accessing the memory 106 directly through memory controller 104. Processor 102 then copies the data test pattern by reading the data test pattern through the PCI bridge 108, PCI bus 114 and the PCI interface of the memory controller 104, and writing the data into the memory 106 through the PCI bridge 108, PCI bus 114 and the PCI interface of the memory controller 104. The resulting copy of the test data pattern is compared to the original test data pattern to determine if any errors occurred during the data transfers.

Since other modifications can be made to fit particular operating specifications and requirements, it will be apparent to those skilled in the art that the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. In a computing network having at least two data storage or processing devices, a method performed by a computer system for providing a complete end-to-end data path verification in the computer system, the computer system comprising at least a first physical data path and a second physical data path from a processor of the computer system to a data receiver of the computer system, the method comprising:
   providing a data initiator within the computer system, the data initiator comprising the processor, wherein the processor is coupled to the first and second physical data paths, and wherein the first and second physical data paths within the computer system are configured to be coupled to the at least two data storage or processing devices in the computing network and external to the computer system;
   transmitting a predetermined data test pattern from the processor to the data receiver of the computer system over the first physical data path, wherein the first physical data path is within the computer system;
   requesting from the data receiver the transmitted predetermined data test pattern that the data receiver received from the data initiator;
   reading the received data test pattern from the data receiver over the second physical data path, wherein the second physical path is within the computer system; and
   comparing the predetermined data test pattern transmitted to the data receiver over the first physical data path with the data test pattern read from the data receiver over the second physical data path.

2. The method for providing a complete end-to-end data path verification in a computer system having at least a first physical data path and a second physical data path, as recited in claim 1, the method further comprising:
   indicating an error condition when the predetermined data pattern transmitted to the data receiver over the first physical data path and the data test pattern read from the data receiver over the second physical data path are different.

3. The method for providing a complete end-to-end data path verification in a computer system having at least a first physical data path and a second physical data path, as recited in claim 2, wherein the transmitting, requesting, reading, and comparing are repeated periodically.

4. The method for providing a complete end-to-end data path verification in a computer system having at least a first physical data path and a second physical data path, as recited in claim 2, wherein the data receiver comprises at least one of the devices: a SCSI controller, a memory controller, a fibre channel controller.

5. The method for providing a complete end-to-end data path verification in a computer system having at least a first physical data path and a second physical data path, as recited in claim 1, wherein the computer system comprises one of the group: a computer and storage router.

6. The method for providing a complete end-to-end data path verification in a computer system having at least a first physical data path and a second physical data path, as recited in claim 5, wherein the computer system further comprises a PCI bus and PCI bridge.

7. The method for providing a complete end-to-end data path verification in a computer system having at least a first physical data path and a second physical data path, as recited in claim 6, wherein the complete end-to-end data path comprises a physical connection with a memory controller.

8. A data storage router having at least two physical data paths for providing a complete end-to-end data path verification in a computer network, the at least two physical data paths comprising a first data path and a second data path, the computer network comprising the storage router and at least two data storage or processing devices, the data storage router coupled to the at least two data storage or processing devices, the data storage router comprising:
 a processor that creates a data test pattern, the data test pattern created to exercise all data lines in the first and second data paths in a high state and a low state;
 a buffer memory for storing a data test pattern;
 a first data path for transferring within the data storage router the data test pattern from the processor to the memory within the data storage router;
 a second data path within the data storage router from the processor to the memory within the data storage router for verifying the transferred data test pattern; and
 wherein the first and second data paths are configured to be able to be coupled to the at least two data storage or processing devices external to the data storage router.

9. The data storage router of claim 8 wherein a memory controller is operatively coupled to the first and second data paths.

10. The data storage router of claim 9 wherein the first path includes a physical coupling between the processor and the memory controller and the second data path includes a PCI bus to which the processor and memory controller are operatively coupled.

11. The data storage router of claim 9 wherein the first data path includes a PCI bus to which the processor and memory controller are coupled and the second data path includes a physical coupling between the processor and the memory controller.

12. The data storage router of claim 8 wherein the first data path includes a first PCI bus and the second data path includes a second PCI bus.

13. The data storage router of claim 8 wherein the processor transfers the data test pattern periodically.

14. The data storage router of claim 8 wherein the processor transfers the data test pattern when a host performs an ending action.

15. The data storage router of claim 8 wherein the data test pattern is separately transferred and verified using both physical data paths.

* * * * *